United States Patent
Juneja et al.

(10) Patent No.: US 12,061,516 B2
(45) Date of Patent: Aug. 13, 2024

(54) DETERMINING FALSE POSITIVE AND ACTIVE EVENT DATA

(71) Applicant: JPMorgan Chase Bank, N.A., New York, NY (US)

(72) Inventors: Garima Juneja, London (GB); Wanpeng Liu, Carshalton (GB); David D. Lin, Tuxedo Park, NY (US); Harsh Bhattachar, Marlboro, NJ (US); Bing Zhang, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/972,914

(22) Filed: Oct. 25, 2022

(65) Prior Publication Data

US 2024/0134734 A1  Apr. 25, 2024
US 2024/0231990 A9  Jul. 11, 2024

(51) Int. Cl.
*G06F 11/07* (2006.01)
*G06N 20/00* (2019.01)

(52) U.S. Cl.
CPC ........ *G06F 11/079* (2013.01); *G06F 11/0709* (2013.01); *G06N 20/00* (2019.01)

(58) Field of Classification Search
CPC .... G06F 11/079; G06F 11/0709; G06N 20/00
See application file for complete search history.

(56) References Cited

U.S. PATENT DOCUMENTS

| | | | |
|---|---|---|---|
| 10,120,746 B1 * | 11/2018 | Sharifi Mehr | H04L 63/1425 |
| 10,289,473 B2 * | 5/2019 | Mendes | G06F 11/0709 |
| 11,611,466 B1 * | 3/2023 | Arzani | H04L 41/5025 |
| 11,929,900 B2 * | 3/2024 | Shemer | H04L 43/065 |
| 2023/0308374 A1 * | 9/2023 | Wang | H04L 43/0876 |

* cited by examiner

*Primary Examiner* — Nadeem Iqbal
(74) *Attorney, Agent, or Firm* — Greenblum & Bernstein, P.L.C.

(57) ABSTRACT

In one example of the present disclosure, a method for determining false positive and active indications is disclosed. The method may apply anomaly network event data to a machine learning model. The machine learning model is trained with historic and correlated anomaly network event data. The method then determines which one of the anomaly network event data is a false positive indication and which one is an active indication.

20 Claims, 7 Drawing Sheets

400

| Network Event Data | Host Name | Short Description | Support Group | Resolved Comments | Status Indicator | Time Stamp |
|---|---|---|---|---|---|---|
| 1 | www.abc.com | Application URL not working | Support13 | Duplicate, reported due to high disk utilization | False Positive | 1:30pm |
| 2 | def.abc | Database service stopped | Support13 | Duplicate, reported due to high disk utilization | False Positive | 1:31pm |
| 3 | geh.abc | Disk Utilization | Support13 | Disk space Increased | Active Indicator | 1:32pm |
| 4 | LOB | System job failure | Support10 | Process restarted | Active indicator | 3:10pm |
| 5 | Fin_LOB | Users unable to open data file | Support10 | Reported due system job failure | False indicator | 3:12pm |

FIG. 4

DETERMINING FALSE POSITIVE AND ACTIVE EVENT DATA

BACKGROUND

One reason for the ubiquity of cloud computing is microservice architecture. Microservices offer well-defined modules of code that can be containerized and reused for different functions. And with microservices, developers can create new capabilities without writing code from scratch.

BRIEF DESCRIPTION OF THE DRAWINGS

Examples of the disclosure will be rendered by reference to specific examples which are illustrated in the appended drawings. The drawings illustrate only particular examples of the disclosure and therefore are not to be considered to be limiting of their scope. The principles here are described and explained with additional specificity and detail through the use of the accompanying drawings.

FIG. 4 illustrates a table showing examples of network event data according to the present disclosure.

DETAILED DESCRIPTION

As noted above, microservices can be deployed on multiple containers. As such, the number of enterprise applications that can be deployed on a cloud service has increased exponentially. This exponential shift to microservices has various consequences. The failure of any single dependence has a significant impact on the upstream performance of the network because of the many microservices that are running and that are dependent on each other. Critical issues may happen in real time where a network event such as a network component failure triggers the failure of another network component.

For example, an end user seeking services from a business entity may attempt to interact with the enterprise web page only to discover that the web page is down. The web page may be down for a multiplicity of reasons ranging from front end issues and application crashes to back end issues and data loss. A software or user support engineer can spend inordinate amounts of time sifting through vast amounts of information before the root cause of the problem is pinned down.

The software engineer may receive an indicator that purportedly points to the problem. The software engineer will spend time tracking this indicator lead to rectify the problem only to find out that the indicator is a false positive one, and that the problem is somewhere else.

Accordingly, examples of the present disclosure address the foregoing by providing a method of determining false positive and active network indications. The method may apply a correlated set of historic anomaly network event data to a machine learning model as a training set to learn patterns between false positive and active events or indicators. The method may then apply a plurality of anomaly network event data (e.g., real time) to the machine learning model and may then determine which one of the anomaly network event data is a false positive indication and which one is an active indication. Thus, the method may determine that a first anomaly network event data is false positive while a second anomaly network event data is active. In this manner, software or user support engineers need not spend inordinate amounts of time sifting through vast amounts of information to determine the root cause of an anomaly network incident. Support engineers need not spend time tracking multiple false positive indicators to rectify an anomaly network problem, particularly in a microservices architecture cloud environment where many microservices are dependent on each other.

Figure 1:
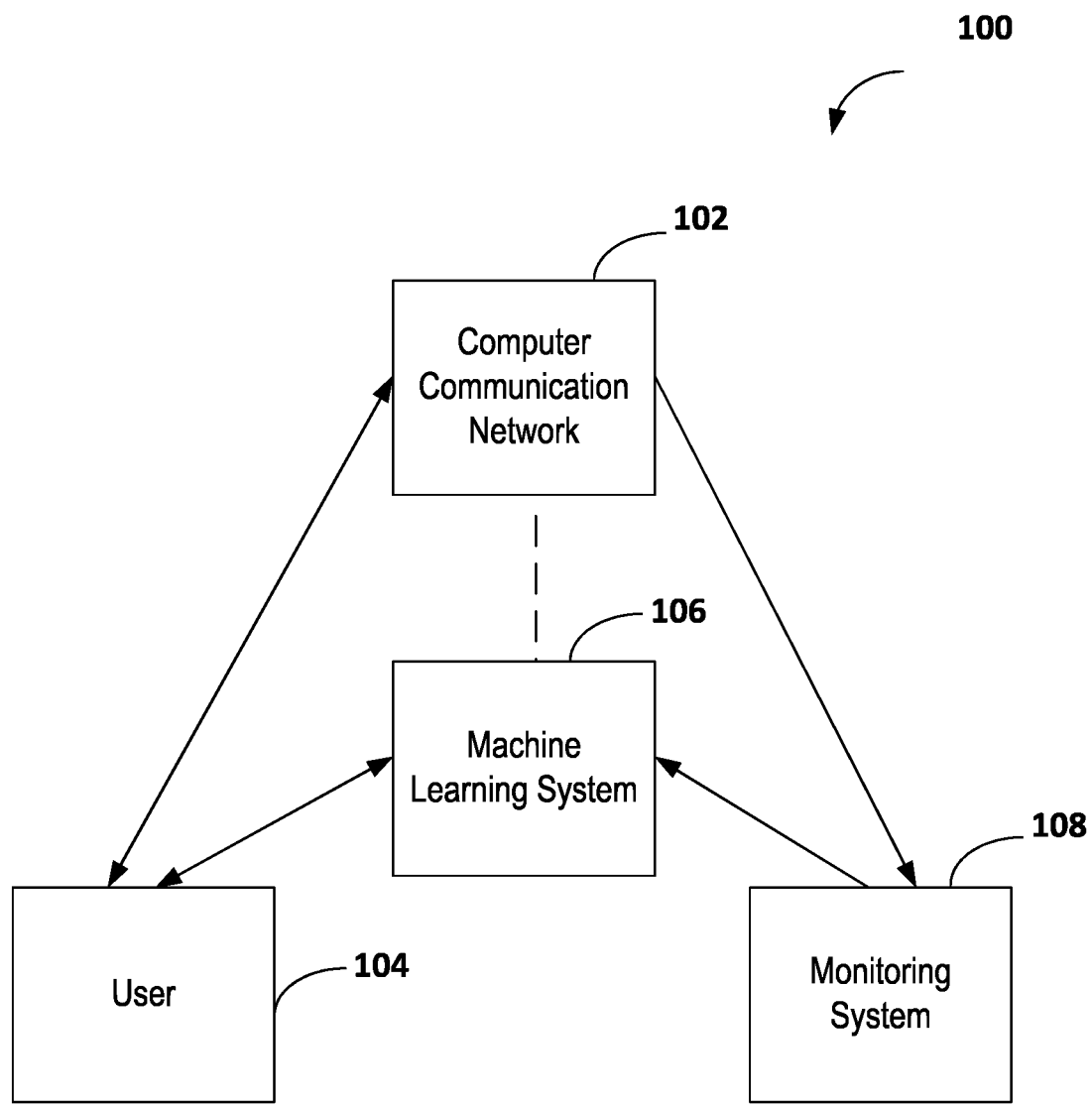
FIG. 1 illustrates an enterprise event data communication platform according to an example of the present disclosure.

FIG. 1 illustrates an enterprise event data communication platform 100 according to an example of the present disclosure.

In FIG. 1, enterprise event data communication platform 100 may facilitate the communication of network event data to a machine learning system 106 for analysis. In one implementation, the network event data may relate to an incident, an alert or a request related to computer communication network 102. In another implementation, the network event data may be a combination of an incident, an alert and a request related to the computer communication network 102. In one example, the network event data may be captured as records or tickets that are acted upon by a support engineer such as user 104. Note that as used herein, the term "implementation" and the term "example" are used interchangeably.

Here, computer communication network 102 can be any communication system that allows point-to-point communication between two or more end points of all data types including audio, video, etc., and any associated metadata. The communication system may comprise a combination of one or more of the Internet and cloud services for the execution of microservice applications. As an example, computer communication network 102 may comprise the Internet, one or more cloud services, etc., associated with an entity that provides products and services to consumers. As shown, the computer communication network 102 of is itself communicably coupled to user 104, and machine learning system 106, and a monitoring system 108.

In operation, when an anomaly network event or incident occurs in computer communication network 102, monitoring system 108 may detect the anomaly network event to create network event data. In one implementation, monitoring system 108 may be a single or a combination of enterprise application monitoring software. As an example, monitoring system 108 can be Jira™ ServiceNow™ and/or Promethus™.

In another example, the network anomaly event may be provided to user 104. The user 104 can communicate with computer communication network 102 to receive information about network events on computer communication network 102. The user 104, alone or in conjunction with monitoring system 108, can then create a ticket or network event data relating to such network events.

User 104 can then utilize the network event data to engage the machine learning system 106 as further described below. In one implementation, user 104 is a single computer device representing an enterprise software engineer or support staff. In another example implementation, user 104 may include a multiplicity of computing support devices representing an entire information system support infrastructure for computer communication network 102.

Here, machine learning system 106, at setup, uses historical network event data for learning and training. Once the learning phase is completed, network event data (e.g., real time) can be applied to machine learning system 106 for analytics purposes and to determine false positive event data (indicators or indications) and active/main event data (indicators or indications).

Figure 2:
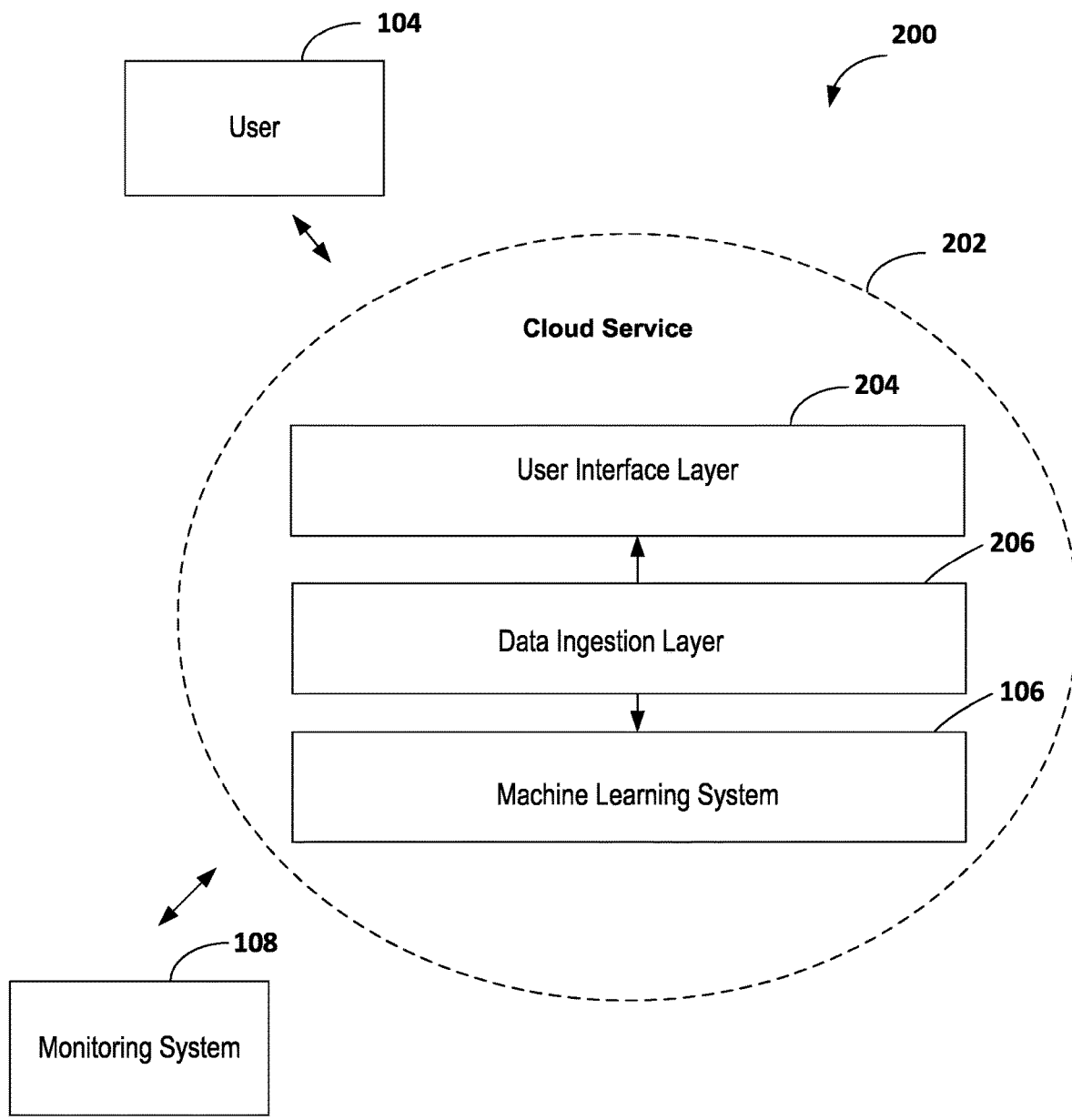
FIG. 2 illustrates a data ingestion architecture to ingest data into the machine learning system 106 (FIG. 1) according to an example of the present disclosure.

FIG. 2 illustrates a data ingestion architecture 200 to ingest data into the machine learning system 106 (FIG. 1) according to an example of the present disclosure.

In this example, data ingestion architecture 200 is implemented within a cloud service 202. In FIG. 1, the cloud service 202 can be a public cloud service, a private cloud service, or a hybrid (public/private) cloud service. For example, the cloud service 202 can be a public cloud such as AWS™ that is owned and/or operated by a public cloud vendor, in order to provide the services of the cloud to subscribers and customers. While cloud service 202 is illustrated as a single cloud service, the cloud computing environment can include additional cloud services, and the arrangement and components of such a cloud computing environment can vary.

As used herein, a "cloud" or "cloud service" can include a collection of computer resources that can be invoked to instantiate a virtual machine, application instance, process, data storage, or other resources for a limited or defined duration, in one example, within a microservices architecture. The collection of resources supporting a cloud can include a set of computer hardware and software configured to deliver computing components needed to instantiate a virtual machine, application instance, process, data storage, or other resources. For example, one group of computer hardware and software can host and serve an operating system or components thereof to deliver to and instantiate a virtual machine. Another group of computer hardware and software can accept requests to host computing cycles or processor time, to supply a defined level of processing power for a virtual machine. A further group of computer hardware and software can host and serve applications to load on an instantiation of a virtual machine, such as an email client, a browser application, a messaging application, or other applications or software. Other types of computer hardware and software are possible.

Here, in FIG. 2, as can be seen, cloud service 202 includes a user interface layer 204, which is itself layered over a data ingestion layer 206. In turn, data ingestion layer 206 is layered over machine learning system 106.

Figure 3:
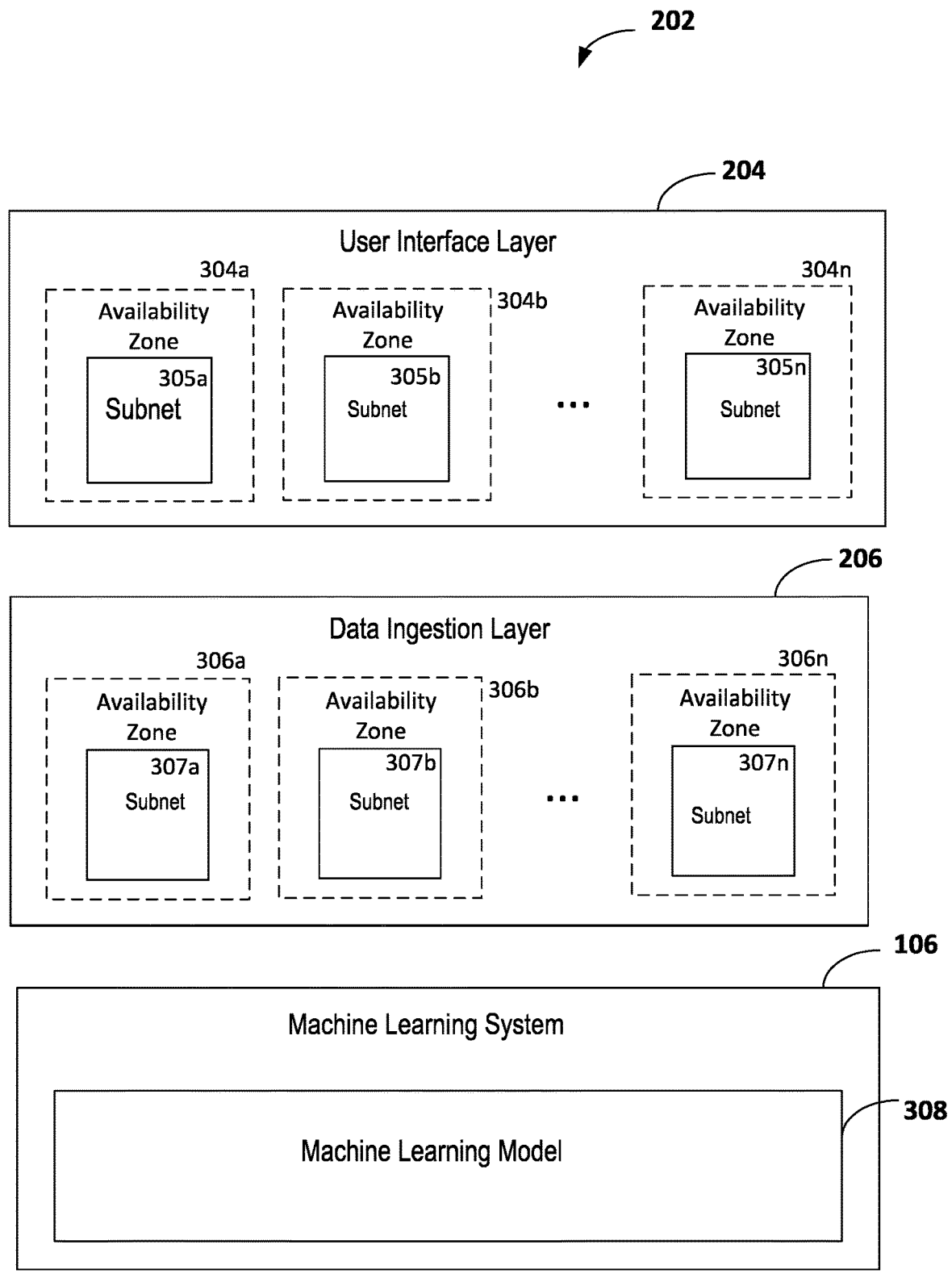
FIG. 3 illustrates example components of the user interface layer, the data ingestion layer and the machine learning system of the cloud service of the data ingestion architecture of FIG. 2.

The machine learning system 106 is itself comprised of a machine learning model 308 (FIG. 3). Machine learning system 106 receives network event data from data ingestion layer 206 for processing by the machine learning model 308.

Data ingestion layer 206 operates by receiving network event data from several sources including monitoring system 108 and user 104 also in FIG. 1. The network event data can be anomaly network event data, such as, relating to the occurrence of an abnormal event on computer communication network 102 (FIG. 1). Here, data ingestion layer 206 receives the network event data, processes the data, transforms, validates, analyzes, sanitizes and/or normalizes the network event data for ingestion by machine learning system 106.

In one implementation, the data ingestion layer 102 itself may receive the network event data from monitoring system 108, which can include multiple sources of event data with differing data types. Data ingestion layer 102 is efficient as transforming the network event data into consistent data types.

Although not shown, the data ingestion layer 206 may include other layers. For example, the data ingestion layer 206 may include a data collector layer, data processing layer, data storage layer, data query layer and/or data visualization layer. The data types may also be real-time, batches or a combination of both.

As shown in FIG. 3, in one implementation, data ingestion layer 206 may be deployed within a virtual private cloud that includes a plurality of availability zones 306a, 306b, . . . 306n each with a respective corresponding subnet 307a, 307b, . . . 307n to increase the resiliency of data ingestion layer 206. Thus, the same application may be deployed in different availability zones in the event that a system failure occurs in one availability zone (in a data center), another availability zone would remain operational.

As previously noted, in FIG. 2, the data ingestion architecture 200 may include UI (user interface) layer 204 that provides network status information to users (e.g., user 104). The network status information may convey recommendations or actions taken about an anomaly network event data and the like.

As an example, user 104 may be a business owner seeking to review information about an application outage. The UI layer 204 receives the application outage information (e.g., time of occurrence, number of impacted users, etc.) from the data ingestion layer 206 for display to UI layer 203. Any recommendations (e.g., increasing the number of instances) may also be provided for viewing. As another example, user 104 may be a production management team that is reviewing a data crash to determine causation, and take the appropriate corrective action. Although not shown, user 104 in conjunction with monitoring system 108 may provide network event data for consumption by machine learning system 106.

As shown in FIG. 3, in one implementation, UI layer 204 may be deployed within a virtual private cloud that includes a plurality of availability zones 304a, 304b, . . . 304n to facilitate resiliency. Each respective availability zone 304a 304b, . . . 304n may further include a subnet 305a, 305b, . . . 305n.

FIG. 4 illustrates a table 400 showing examples of network event data for use with examples of implementations of the present disclosure.

In the example of FIG. 4, the network event data is generated by user 104 in conjunction with monitoring system 108 (FIG. 1). In another example, the network event data is generated automatically by monitoring system 108 without interaction from user 104.

When a network event occurs (e.g., enterprise website application not loading), user 104 generates a corresponding network event data or ticket related to the occurrence of the network event. Here, table 400 shows five network event data, namely, network event data 1, 2, 3, 4 and 5. For network event data 1, shown in row 1 of table 400, the host name on which the incident occurred is "www.abc.com," as shown. The short description of the incident is "Application URL not working." The support group responsible for the host name is "Support13." The resolved comments are "Duplicate, reported due to high disk utilization." The network event data includes a status indicator of "False Positive," and the timestamp shows that the event occurred at 1:30 pm. Similarly, information for network data events 2, 3, 4 and 5 are shown on the table.

Correlation: The network data events 1, 2, 3, 4 and 5 of table 400 can be correlated by user 104 for analytics to facilitate the determination of which network events/indicators are false positive and which ones are main/active indicators. By "correlated" or "correlation," it is meant that common attributes or relationships between the network events are identified and a single active or main indication remains in one group with multiple false indications.

As an example, a common attribute or relationship between network event data 1 and network event data 2 is the time of occurrence, as shown by the timestamp. Both network events occur proximate to each other, one at 1:30 pm and the other at 1:31 pm. As another example, network event data 1 and network event data 2 have the same support group namely "Support13."

Once the common attributes are identified, the network event data can be segregated into groups based on the common attributes that are identified. In one example, the network event data is segregated based on a single common attribute. In another example, the network event data is segregated based on all the multiple common attributes that are identified.

Thus, in FIG. 4 table 400, correlation, network event data 1, 2 and 3 are segregated into a single group because they have the same attributes. That is, network event data 1, 2 and 3 have the same support group, i.e., Support13 and the network events occurred around the same time, i.e., network event data 1 occurred at 1:30p; network event data 2 occurred at 1:31 pm and network event data 3 occurred at 1:32 pm.

Based on further analysis, user 104 then determines which of the three network event data is an active (or main) indicator or event. User 104 has sufficient experience based on prior incidents based on historical data, for example, to know which events are active indicators and which ones are false positive. In this case, network event data 3 is determined to be the active alert while network event data 1 and network event data 2 are false positive indicators.

As used herein, the term "false positive" is to identify an indicator, indication, event, or alert related to an abnormal network event that occurs in the computer communication network 102 because of the occurrence of another abnormal event. As used herein, the term "active" or "main" is to identify an indicator, indication, event, or alert related to an abnormal network event that occurs in the computer communication network 102 that can trigger the occurrence of other abnormal events. Resolution of the network incident related to the active alert then closes the associated false positive indicators or network event data.

Similarly, in table 400, for correlation, network event data 4 and 5 are segregated into a single group. Network event data 4 and 5 have the same support group, i.e., Support10 and their occurrence is proximate in time, i.e., network event data 4 occurred at 3:10 pm; network event data 5 occurred at 3:12 pm. Similarly, network event data 4 is determined to be the active indicator while network event data 5 is false positive. Once the network event data are correlated into patterns of active and false positive network event data, the correlated patterns can be utilized as a training set for the machine learning model 308 as further described with reference to FIG. 5 below.

Figure 5:
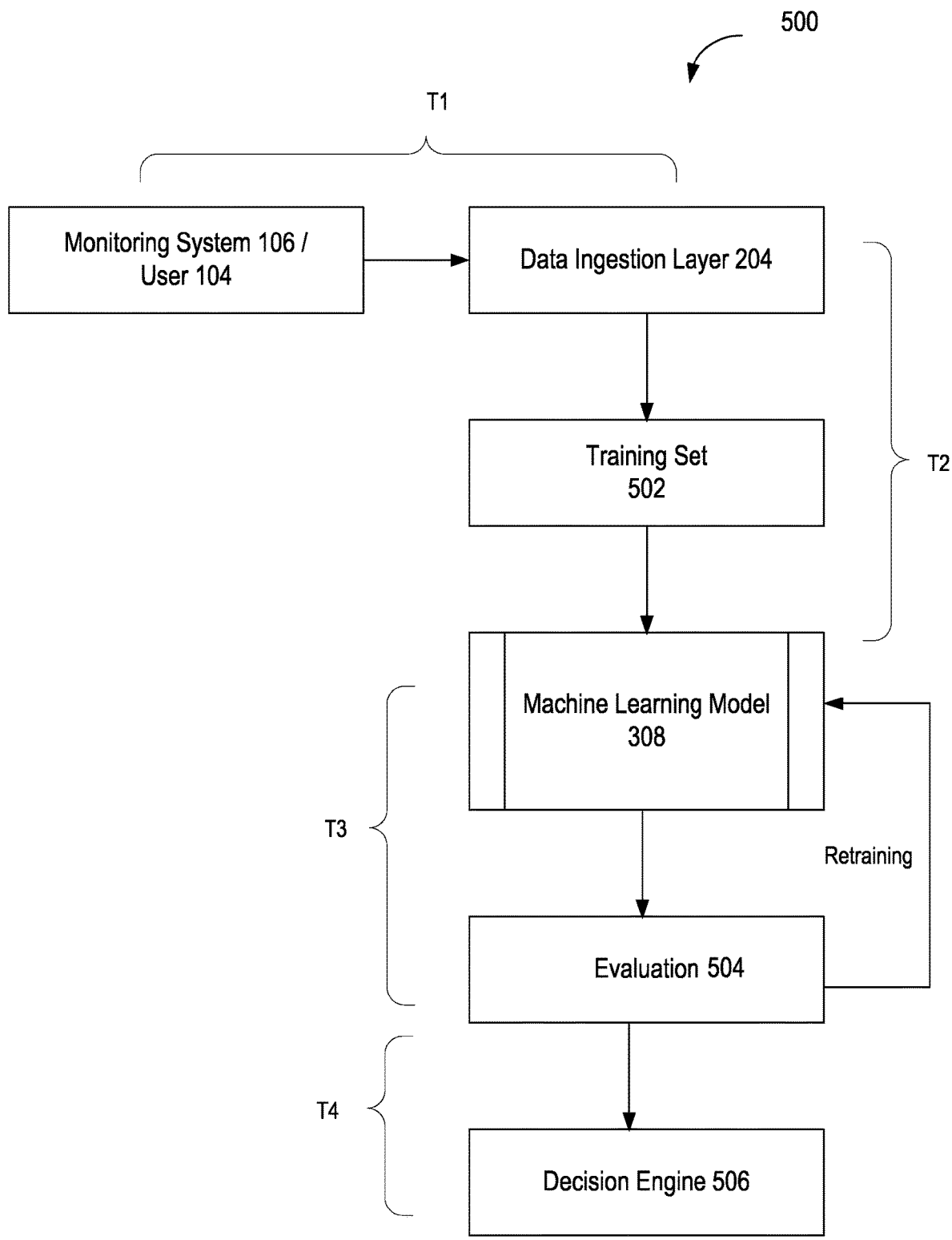
FIG. 5 illustrates a sequence flow diagram to set up the machine learning model of FIG. 3 according to an example of the present disclosure.

FIG. 5 illustrates a sequence flow diagram 500 to set up machine learning model 308 of FIG. 3 according to an example of the present disclosure.

At T1, monitoring system 106 and/or user 104 feeds network event data to the data ingestion layer 204. At T2, a subset of the network event data is applied to machine learning model 308. In one implementation, the subset of network event data is correlated network event data, for example, as described above with reference to table 400. This correlated network event data is applied as a training set 502.

At T3, machine learning model 308 may learn by repeatedly evaluating, at evaluation 504, the correlated network event data, generating selections and/or predictions based upon the evaluations, and adjusting outcomes based upon the accuracy of the selections and/or predictions. In one example, the machine learning model 308 may learn through training by comparing selections and predictions to known outcomes. As training progresses, the selections/predictions of the machine learning model 308 may become increasingly accurate.

In an implementation, machine learning model 308 may be based on a neural network. In another implementation, machine learning model 308 is based on a regression model. Further yet, in an implementation, machine learning model 308 may be based on a regression model. These are but examples and are not intended to limit the implementation of machine learning model 308.

At T4, once training and setup is complete, and evaluations become satisfactory, the machine learning model 308 is a decision engine 506 that can render decisions for subsequent anomaly network event data system (nonhistorical, real-time, etc.) to determine false positive and active event indications. The decision engine 506/machine learning model 308 becomes increasing more accurate at determining which network events are false positive indications and which ones are active indications.

Figure 6:
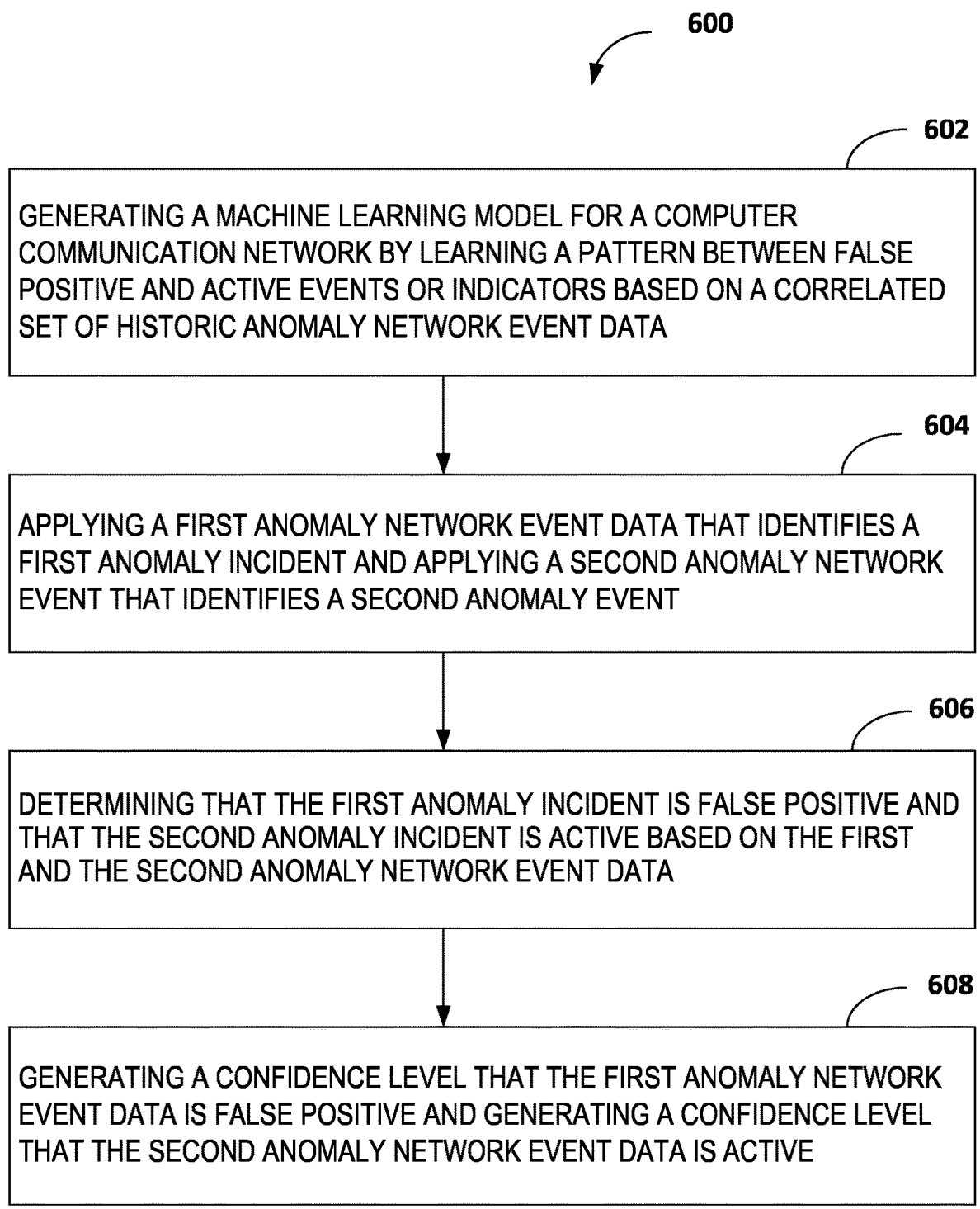
FIG. 6 illustrates a method of identifying false positive network event data according to an example of the present disclosure.

FIG. 6 illustrates a method 600 of determining false positive and active network indications in the computer communication network 102 (FIG. 1) according to an example of the present disclosure.

At block 602, method 600 involves generating the machine learning model 308 (FIG. 3) for computer communication network 102 by learning a pattern between false positive and active events or indicators based on a correlated set of historic anomaly network event data (e.g. FIG. 4, table 400).

At block 604, method 600 involves applying a first anomaly event data that identifies a first anomaly event and applying a second anomaly network event that identifies a second anomaly event. The first anomaly event may be a stopped database service, for example. The second anomaly event may be an application URL that has stopped working. As used herein, anomaly network event data refers to event data that relates to an abnormal incident, system failure, or anomaly in a computer communication system or network and any related alert, request, record or ticket thereof. For example, an example anomaly event data may be as follows:

```
{
  "Details": [
    {
      "Id": 101
      "Source": "Service-Now",
      "Event": "Application URL not Working",
      "TimeStamp": "2022-01-01 10"
      "Host": "www.abc.com"
```

```
        }
        {
            "Id": 101
            "Source": "JIRA",
            "Event": "Disk Utilization",
            "TimeStamp": "2022-01-01 00"
        }
    ]
}
```

The anomaly network event data may relate to a stopped database service. The anomaly network event data may relate to an application URL (Uniform Resource Locator) that is not working. The anomaly network event data may relate to a stalled job process. Other examples may relate to E-Commerce transaction issues, cloud service/content management system, connection issues, storage issues, CPU and memory utilization issues, node resource utilization. The afore-mentioned issues are not exhaustive. For example, anomaly network event data may also relate to long running DB queries and the request and response rate of an application.

At block 606, method 600 then determines that the first anomaly incident is false positive and that the second anomaly incident is active based on the first and the second anomaly network event data. Thereafter, the false positive indication may be closed along with the corresponding network event data. The second anomaly incident can then be focused on and resolved. Resolution of the second anomaly incident may also trigger closure of the false positive indication.

At block 608, method 600 generates a confidence level that the first anomaly network event data is the false positive indication. The confidence level is a percentage of the level of certainty that the network event data is a false positive indication. For example, the percentage of certainty may be 75%. The method 600 may set a percentage threshold or range below which the false positive determination would be unacceptable. For example, the acceptable percentage range of certainty may be between 70% and 100%.

At block 608, method 600 may also generate a confidence level that the second anomaly network event data is the active indication. The confidence level is a percentage of the level of certainty that the network event data is an active indication. For example, the percentage of certainty may be 75%. The method 600 may set a percentage threshold or range below which the active determination would be unacceptable. For example, the acceptable percentage range of certainty may be between 70% and 100%.

Figure 7A:
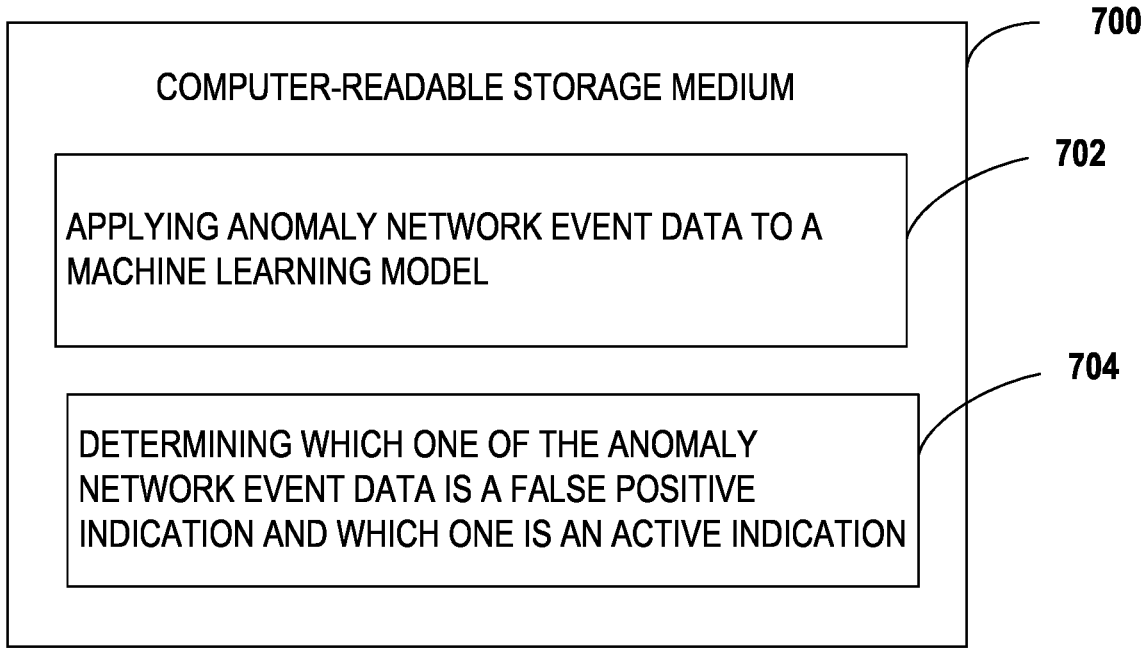
FIG. 7A illustrates a non-transitory computer-readable storage medium according to an example of the present disclosure.
Figure 7B:
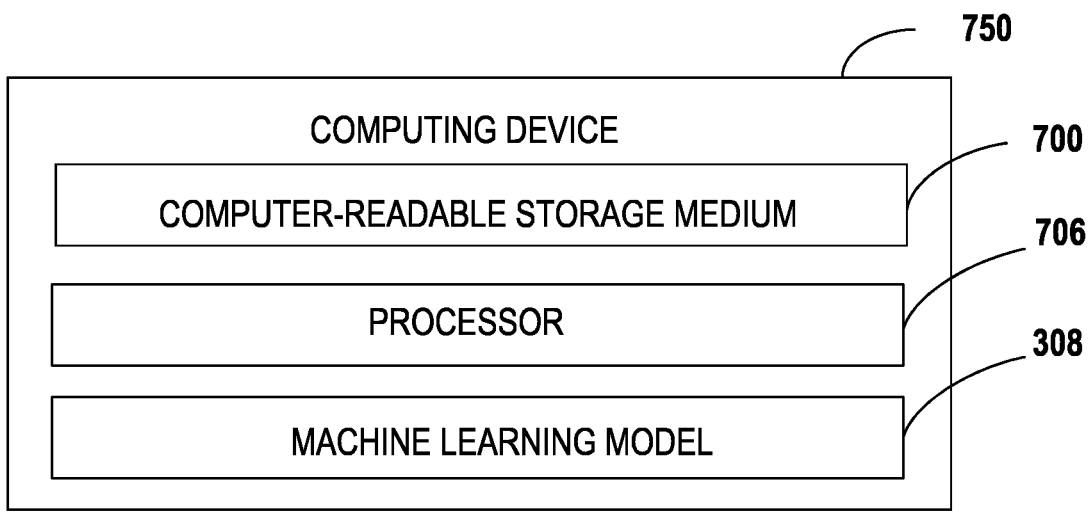
FIG. 7B illustrates a computing device according to an example of the present disclosure.

FIG. 7A illustrates example instructions stored on a non-transitory computer-readable storage medium 700 to determine (in one example) false positive and active network indications according to the present disclosure, and FIG. 7B illustrates an example computing device 750 according to the present disclosure.

As shown in FIG. 7A, the non-transitory computer-readable storage medium 700 includes instruction 702 and instruction 704. Instruction 702 may cause a processor 706 to apply anomaly network event data to machine learning model 308. The anomaly network event data may relate to an incident, system failure or anomaly in the computer communication network 102 of FIG. 1. In some examples, the anomaly network event data may be or relate to a stopped database service, to an application URL not working or to a stalled job process.

Instruction 704 may determine which one of the anomaly network event data is a false positive indication (also referred to as an indicator, alert, request or incident), and which one is an active indication (also referred to as indicator, alert, request or incident).

Although not shown, the computer-readable medium 700 may also have instructions to generate a confidence level that the anomaly network event data is the active indication, and to generate a confidence level that the anomaly network event data is the false positive indication.

The non-transitory computer-readable storage medium 700 may be any electronic, magnetic, optical, or other physical storage device that stores executable instructions. For example, the non-transitory computer-readable storage medium 700 may be random access memory (RAM), an electrically-erasable programmable read-only memory (EEPROM), a storage drive, an optical disc, or the like. The non-transitory computer-readable storage medium 700 can be encoded to store executable instructions that cause the processor 706 to perform operations according to examples of the disclosure.

The present disclosure may employ a software stack to enlist the underlying tools, frameworks, and libraries used to build and run example applications of the present disclosure. Such a software stack may include PHP, React, Cassandra®, Hadoop®, Swift®, etc. The software stack may include both frontend and backend technologies including programming languages, web frameworks servers, and operating systems. The frontend may include JavaScript®, HTML, CSS, and UI frameworks and libraries. In one example, a MEAN (MongoDB®, Express.js, AngularJS, and Node.js) stack may be employed. In another example, a LAMP (Linux®, Apache®, MySQL®, and PHP) stack may be utilized.

While particular examples have been described, various modifications, changes and substitutions are intended in the foregoing disclosures, and it will be appreciated that in some instances some features of particular examples will be employed without a corresponding use of other features without departing from the scope and spirit as set forth. Therefore, many modifications may be made to adapt a particular situation or material to the essential scope and spirit.

Any suitable programming language can be used to implement the routines of particular examples including C, C++, Java®, JavaScript®, assembly language, etc. Different programming techniques can be employed such as procedural or object oriented. The routines may execute on specialized processors.

The specialized processor may include memory to store a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a software program.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the above is a complete description of specific examples of the disclosure, additional examples are also possible. Thus, the above description should not be taken as limiting the scope of the disclosure, which is defined by the appended claims along with their full scope of equivalents.

The invention claimed is:

1. A non-transitory computer-readable storage medium with program instructions stored thereon, the program instructions when executed by one or more processors are operable to cause the one or more processors to perform operations comprising:
generating a machine learning training set comprising correlated network event data from a data ingestion layer comprising data collector layer, data query layer, data processing layer, data storage layer, data query layer, and data visualization layer based on network event data collected by a monitoring system or a user and transmitted to the data ingestion layer;
training iteratively a machine learning model through iterative evaluations and analyses by learning patterns between false positive and active events or indicators based on the machine learning training set with the correlated network event data comprising a correlated set of historic anomaly network event data generating outcomes comprising predictive selections or predictions via the machine learning model and adjusting the machine learning model until the outcomes generated based on the machine learning training set are accurate, resulting in a trained machine learning model;
executing the trained machine learning model with real-time anomaly network event data; and
generating outcomes from the executed trained machine learning model comprising determination that one of the anomaly network event data is a false positive indication and other one of the anomaly network event data is an active indication.

2. The computer-readable medium of claim 1, wherein the anomaly network event data comprises an incident, system failure, or anomaly in a computer communication network.

3. The computer-readable medium of claim 1, wherein the operations further comprise generating a confidence level that the other one of the anomaly network event data is the active indication.

4. The computer-readable medium of claim 1, wherein the operations further comprise generating a confidence level that the one of the anomaly network event data is the false positive indication.

5. The computer-readable medium of claim 1, wherein the anomaly network event data is a stopped database service.

6. The computer-readable medium of claim 1, wherein the anomaly network event data relates to an application URL not working.

7. The computer-readable medium of claim 1, wherein the computer communication network is within a cloud service having a microservice architecture comprising a plurality of availability zones that each comprise a corresponding sub-network.

8. A method of training a machine learning model determining false positive and active network indications, the method comprising:
generating a machine learning training set comprising correlated network event data from a data ingestion layer comprising data collector layer, data query layer, data processing layer, data storage layer, data query layer, and data visualization layer based on network event data collected by a monitoring system or a user and transmitted to the data ingestion layer;
training iteratively a machine learning model through iterative evaluations and analyses by learning patterns between false positive and active events or indicators based on the machine learning training set with the correlated network event data comprising a correlated set of historic anomaly network event data generating outcomes comprising predictive selections or predictions via the machine learning model and adjusting the machine learning model until the outcomes generated based on the machine learning training set are accurate, resulting in a trained machine learning model;
executing the trained machine learning model with real-time first anomaly network event data identifying a first anomaly incident and with real-time second anomaly network event data identifying a second anomaly incident; and
generating outcomes from the executed trained machine learning model comprising determination that the first anomaly incident is false positive and determination that the second anomaly incident is active based on the first and the second anomaly network event data.

9. The method of claim 8, further comprising generating a confidence level that the first anomaly incident is false positive.

10. The method of claim 8, further comprising generating a confidence level that the second anomaly incident is active.

11. The method of claim 8, wherein the first anomaly incident is a stopped database service and the second anomaly incident is an application URL not working.

12. The method of claim 8, wherein the first anomaly incident is a stalled job process.

13. A method of training a machine learning model determining false positive and active network indications, the method comprising:
generating a machine learning training set comprising correlated network event data from a data ingestion layer comprising data collector layer, data query layer, data processing layer, data storage layer, data query layer, and data visualization layer based on network event data collected by a monitoring system or a user and transmitted to the data ingestion layer;
training iteratively a machine learning model through iterative evaluations and analyses by learning patterns between false positive and active events or indicators based on the machine learning training set with the correlated network event data comprising a correlated set of historic anomaly network event data generating outcomes comprising predictive selections or predictions via the machine learning model and adjusting the machine learning model until the outcomes generated based on the machine learning training set are accurate, resulting in a trained machine learning model;
executing the trained machine learning model with real-time plurality of anomaly network event data; and
generating outcomes from the executed trained machine learning model comprising determination that one of the anomaly network event data is a false positive indication and other one of the anomaly network event data is an active indication.

14. The method of claim 13, further comprising determining that a first anomaly network event data is false positive.

15. The method of claim 14, further comprising determining that a second anomaly network event data is active.

16. The method of claim 14, further comprising generating a confidence level that the first anomaly network event data is false positive.

17. The method of claim 15, further comprising generating a confidence level that the second anomaly network event data is active.

18. The method of claim 13, wherein the first anomaly incident is a stopped database service and the second anomaly incident is an application URL not working.

19. The method of claim 13, wherein the first anomaly incident is a stalled job process.

20. The method of claim 8, wherein the data ingestion layer performs operations comprising processing, transforming, validating, analyzing, sanitizing and normalizing the collected network event data.

\* \* \* \* \*